United States Patent

[11] 3,528,397

| [72] | Inventor | Richard Seifert<br>Friedrichshafen-Manzell, Germany |
|------|----------|---|
| [21] | Appl. No. | 686,174 |
| [22] | Filed | Nov. 28, 1967 |
| [45] | Patented | Sept. 15, 1970 |
| [73] | Assignee | Motoren- und Turbinen-Union<br>Friedrichshafen Geselsschaft mit<br>beschankter Haftung |
| [32] | Priority | Dec. 3, 1966 |
| [33] |  | Germany |
| [31] |  | No. M71880 |

[54] WELDED CYLINDER AND CRANKSHAFT HOUSING
8 Claims, 5 Drawing Figs.

[52] U.S. Cl. ............................................ 123/195,
123/41.72
[51] Int. Cl. .............................................. F02f 7/00,
F02f 1/10
[50] Field of Search ................................... 123/195S,
195, 41.72

[56] References Cited
UNITED STATES PATENTS

| 1,402,695 | 1/1922 | Wall | 123/195(S)UX |
| 2,030,995 | 2/1936 | Loeffler | 123/195(S)UX |
| 2,838,038 | 6/1958 | Seifert et al. | 123/195(S)UX |
| 3,045,898 | 7/1962 | Hilfing et al. | 123/195(S)UX |
| 3,064,633 | 11/1962 | Seifert et al. | 123/195(S)UX |

FOREIGN PATENTS

| 1,216,673 | 11/1959 | France | 123/195(S)UX |

Primary Examiner—Wendell E. Burns
Attorney—Craig, Antonelli, Stewart and Hill

ABSTRACT: A cylinder-crankshaft housing which is welded together of cast steel parts and/or sheet material for a multi-cylinder liquid-cooled engine in which the housing is subdivided transversely to its longitudinal axis into individual housing elements; the housing elements are comprised within the cylinder area of one-half each of two adjacent continuous cylinder parts shaped as approximately semi-cylindrical supports to accommodate a cylinder cooling jacket and provided with support flanges, and within the area of the crankshaft bearing of a support wall having an opening for the crankshaft; the individual parts are connected by means of welding seams transmitting the dynamic stresses; the cylinder support flanges as well as a wall extending parallelly and longitudinally may be integrally cast to the cylinder supports together with bosses for the cylinder head mounting bolts.

INVENTOR
RICHARD SEIFERT

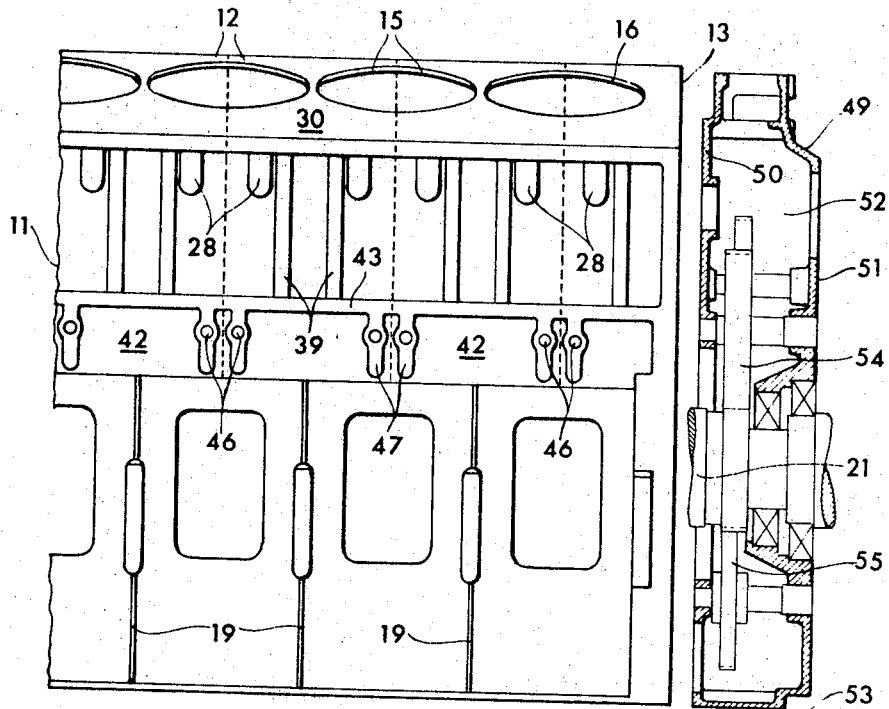
FIG. 3
FIG. 4
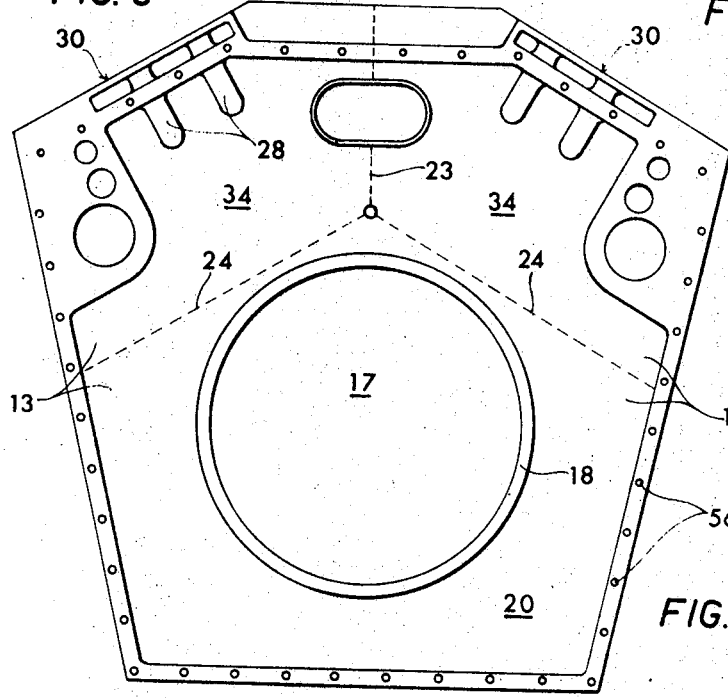
FIG. 5
INVENTOR
RICHARD SEIFERT
BY Craig & Antonelli
ATTORNEYS

WELDED CYLINDER AND CRANKSHAFT HOUSING

The present invention relates to a multi-cylinder liquid cooled internal combustion piston engine, especially to high-speed Diesel engines with high specific output, and in particular relates to cylinder and crankcase housings for such engines which consist of cast steel parts and sheet metal parts welded together.

According to the German Letters Patent 1,023,270, corresponding to U.S. Pat. No. 2,838,038, a cylinder and crankshaft housing is known for a multi-cylinder liquid cooled piston engine, particularly for a high-speed Diesel engine of high specific output, which is welded together of cast steel parts and sheet metal parts. This housing is subdivided transversely to the longitudinal axis of the engine into individual element-areas, including an upper cylinder area and a lower crankshaft bearing area, the individual elements including, in the cylinder area, of one half each of two adjacent continuous cooling jackets and, in the area of the crankshaft bearing, of a support wall made of cast steel. All bearing-support wall-openings form together a crankshaft tunnel, in which the crankshaft is supported on its disc-like crankwebs. Both element-areas, i.e., the upper cylinder area and the lower crankshaft area, may either be cast in one piece or can be fabricated from several pieces. In the latter case the individual pieces are connected by means of a welding seam, transmitting the dynamic stresses between the cylinder head and the crankshaft bearing. The cylinder and crankshaft housing, welded together from these individual pieces, forms a kind of a frame-work, onto which end covers or reinforcing longitudinal walls made of sheet metal are mounted, possibly by welding. The welding seams, transmitting the dynamic stresses between the two areas proved to be extremely efficient during operation of the engine, however higher stresses arose in the longitudinal outer housing walls which partly caused cracking. Also, the cooling jackets, circumcirculated by the cooling water, leaked occasionally so that the cooling water entered the housing at these spots. These disadvantages are avoided by the present invention.

The present invention starts with the known cylinder and crankshaft housing and comprises the following characteristics:

a. The two adjacent continuous cylinder halves are shaped as approximately semicylindrical supports to accommodate a cylindrical liquid cooling jacket, into which the cylinder liner is inserted;

b. Integrally cast to the cylinder supports are the bosses for the cylinder-head mounting-bolts, the cylinder supporting flange and, underneath within a predetermined distance from the supporting flange, the longitudinal wall arranged parallel to this flange;

c. The crankshaft bearing support wall within the lower area of the cylinder supports extends approximately to the cylinder supporting flange between the adjacent cylinder supports and also extends within the upper area into the fillet between the cylinder supports.

The crankshaft bearing support wall can either be made of cast steel or, should this not be possible from the point of view of casting techniques due to its size, can be welded together of individual sheet-metal parts. A housing is created by the present invention, which is capable of withstanding high dynamic stresses. The cooling water circulation is limited to such parts, which are easily controllable by gaskets. The housing is especially suitable for four-cycle internal combustion piston engines, the camshafts of which are arranged in the lower area of the cylinders. The cams act, by way of push rods and rocker arms on the valve and actuate the individual fuel injection pump for each cylinder. The individual fuel injection pump for each cylinder is used with the aforementioned diesel engines, however, in these engines, the pump and injection nozzle are combined into one injector unit per cylinder, and both camshafts are arranged in the longitudinal direction above the cylinder head on each side.

According to a further improvement of the present invention, for the design equipped with a valve control by means of push rods, the transverse partition wall extending vertically up to the cylinder supports bifurcated into two walls, thereby providing bearing supports, in order to accommodate the actuating cam for the individual fuel injection pump, individually for each cylinder and being arranged between these walls in the transversal plane between the cylinders. The construction of this special type of design of the housing enables the advantageous application of an individual injection device separate for each cylinder; the injection devices are completely identical and are therefore subject to the same injection principles.

The rigidity of the housing against dynamic stresses is especially increased in that the cylinder support wall extending parallelly to and longitudinally of the cylinder supporting flange terminates within the cylinder area in a longitudinal outer wall part, which is located in the same plane as the lateral outer edge of the crankshaft bearing support wall and the lateral outer flange of the cylinder supporting flange, carrying the individual fuel injection pump. Contrary to the waist-like contractions generally customary in V-engines, this arrangement permits the dynamic stresses to be absorbed by the housing in a nearly uninterrupted plane.

According to the present invention, the wall extending longitudinally of and parallelly to the cylinder supporting flange is provided with one or more reinforcements within each cylinder area for the accommodation of bores. These bores lead to the cooling jacket of the adjacent cylinder and are interconnected by a cooling liquid feed line, disposed externally at the outer longitudinal side of the engine. As a result thereof, the cooling water circulates through special lines in the housing, and a leaking of water into the housing is prevented by separate, well controllable gaskets.

Since there is no strengthening effect of the adjacent cylinder elements at the end elements of the known housing (German Letters Patent 1,023,270, or U.S. Pat. No. 2,838,038), separate end elements have already been proposed heretofore (German Letters Patent 1,159,212, or U.S. Pat. No. 3,064,633), which takeover the missing strengthening effect.

According to the present invention, these reinforcements are applied in an analogous manner, however a second transversal wall is added to this known case-like, preferably cast end piece, which faces the end piece and also includes the means necessary for driving the timing gears, accessory drives, gear means, and the like. The thus completely enclosed case, together with its contents is interchangeably connected to the housing end elements, for example, by means of bolts, in order to take over the necessary reinforcement.

Accordingly, it is an object of the present invention to provide a multi-cylinder liquid cooled internal combustion piston engine which obviates by simple means the aforementioned shortcomings and drawbacks encountered in the prior art.

Another object of the present invention resides in a cylinder crankcase housing for a multi-cylinder liquid cooled internal combustion piston engine which minimizes the danger of crack formation and at the same time eliminates the danger of leakage in the cooling water system.

A further object of the present invention resides in a multi-cylinder liquid cooled internal combustion piston engine of the type described above, especially for high-speed diesel engines with high specific output, in which the housing for the cylinder and crankcase is capable of withstanding the dynamic stresses in a most satisfactory manner and which permits at the same time the use of a separate injection device for each cylinder with all injection devices completely identical.

These and further objects, features and advantages of the present invention will become more obvious from the following description when taken in connection with the accompanying drawing which shows, for purposes of illustration only, one embodiment in accordance with the present invention and wherein:

FIG. 3 is a partial side view of the housing of FIGS. 1 and 2;

FIG. 4 is a vertical longitudinal cross-section through a gear train housing, which is mounted at one end of the engine; and FIG. 5 is an end view onto one of the front faces of the housing.

Figure 1:
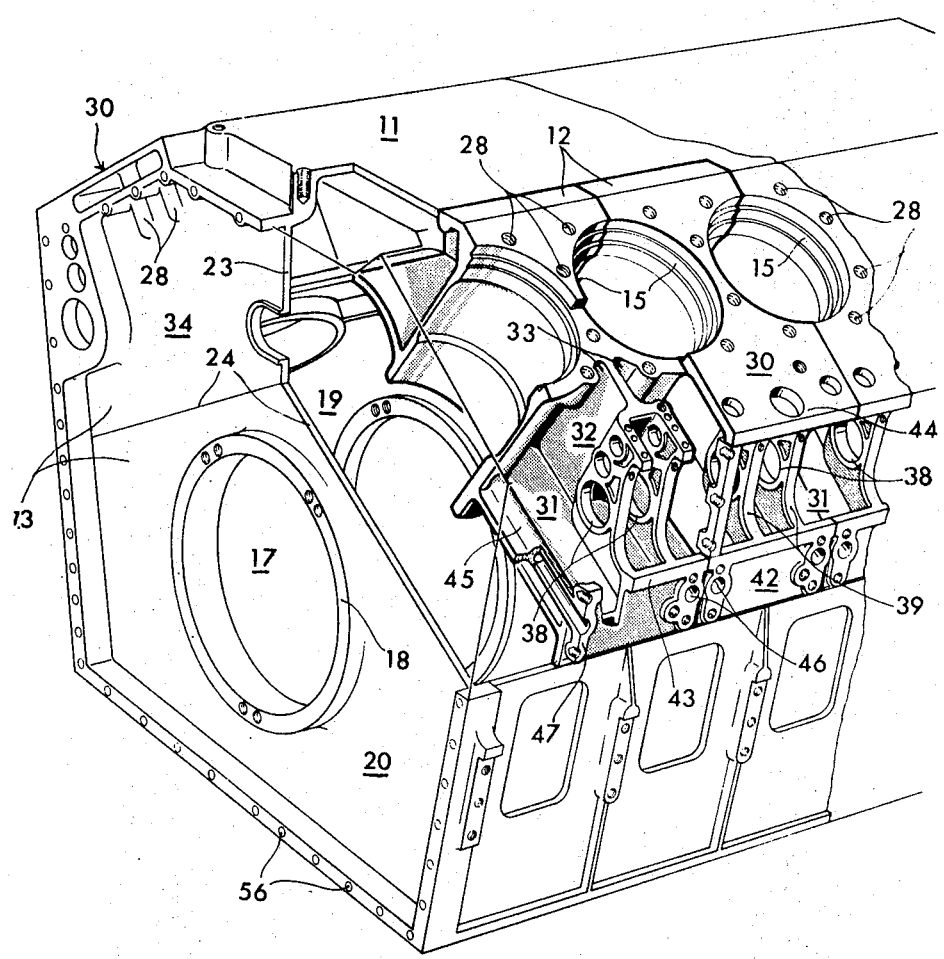
FIG. 1 is a perspective view of the housing according to the present invention, partially in cross-section.
Figure 2:
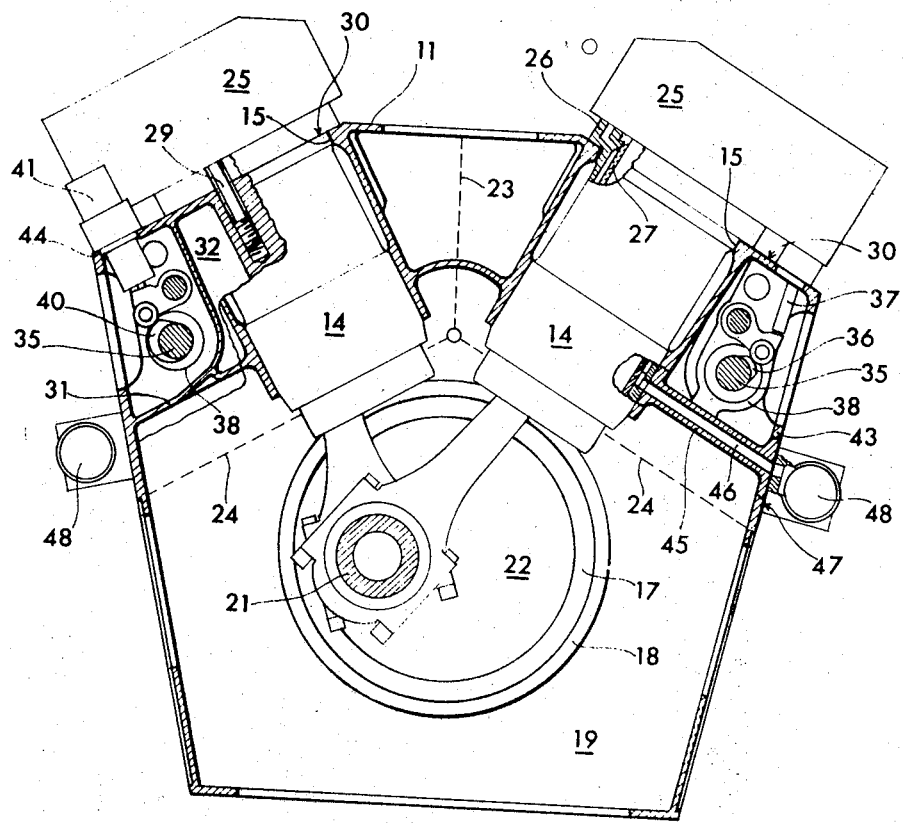
FIG. 2 is a transverse cross-sectional view, in which the parts of the engine not forming part of the present invention, are drawn in thin lines.

Referring now to the drawing wherein like reference numerals are used throughout the various views to designate like parts, the cylinder and crankshaft housing 11, welded together of cast-steel parts and plates, is subdivided transversely to the longitudinal axis of the engine into five intermediate elements 12 and one end element 13 each. With the area of the cylinders 14 (FIG. 2) each of the intermediate elements 12 consists of one half of two adjacent, continuous and semi-circular cylinder support halves 15 (FIG. 1), made of cast steel. Within this area, the end elements 13 comprise only one cast steel cylinder support half 16 (FIG. 3) within the area of the crankshaft bearing indicated by reference numeral 17 (FIGS. 1, 2 and 5), the elements 12 or 13 consist of a crankshaft bearing outer race 18 and of a support wall 19 or 20, respectively, and are welded together from sheet-metal. The support walls 19 and 20 together with the crankshaft outer races 18 form a crankshaft tunnel, in which the crankshaft 21 (FIGS. 2 and 4) is supported on its disc-shaped crankwebs 22. Within the cylinder area the elements 12 and 13 are subdivided along the vertical longitudinal center plane of the housing and are connected to each other by means of welding seams 23 (FIGS. 2 and 5). They are connected to the crankshaft support wall 19, 20, by a welding seam 24 each, which transmits the dynamic forces between the cylinder head 25 and the crankshaft bearing 17. The cylinders 14, consisting of the cooling jackets 26 and cylinder liners 27 are inserted into the cylinder supports, formed by the support halves 15 and 16 (FIG. 2). Bosses 28 (FIGS. 1 and 3) for the cylinder head mounting bolts 29, (FIG. 2), cylinder supporting flanges 30, and longitudinal walls 31, which are disposed parallel to the flanges 30 within the lower area, are integrally cast to the cylinder supports 15/15 and 15/16. Transversal walls 32 extend upwards in the extension of the crankshaft bearing support walls 19 and 20 into the area of the cylinder supports 15/15, approximately to the cylinder supporting flanges 30 between the adjacent cylinder supports 15/15 (FIG. 1). These transversal walls 32 extend all the way into the fillets 33, located between the cylinder supports 15/15. In the end elements 13, the front faces of the housing 11 are formed by the transversal walls 34, which are integrally cast to the cylinder support halves 16 and corresponding to the transversal walls 32 together with the crankshaft bearing support wall 20 (FIGS. 3 and 5).

Camshafts 35 (FIG. 2) whose cams 36 act by way of push rods 37 on the valves of each cylinder, are arranged in the lower part of the cylinders 14. The transversal walls 32 and 34, through which extend the camshafts 35, are forked outwardly into two walls 39 (FIG. 1) to accommodate bearings 38. A cam 40 (FIG. 2) for actuating an individual fuel injection pump 41, with a separate fuel injection nozzle is arranged in the space between these two walls 39.

The wall 31 extending parallelly and longitudinally to the cylinder supporting flange 30, which originates at the cylinder support 15/15 or 15/16 terminates on the outside of the housing 11 in a longitudinal outer wall part 42 below the opening accommodating the camshaft. This outer wall part 42 is located in the same plane as the lateral outer edge 43 of the crankshaft bearing support wall 19 or 20, and as a lateral outer flange 44 of the cylinder supporting flange 30, carrying the individual fuel injection pump 41.

In the area of each cylinder, the wall 31 extending parallelly and longitudinally to the cylinder supporting flange 30 is provided with one or more reinforcements 45 for the accommodation of bores 46 leading to the cooling jackets 26 of the next adjacent cylinder 14. The bores 46 open into outer flanges 47, which are integrally cast to the outer wall parts 42, and which are connected to a cooling water feed line 48 (FIG. 2).

Since there are no adjacent cylinder support halves, the end elements 13 are reinforced by means of a case-like end piece. The timing gear housing shown in FIG. 4 is such a case-like, cast-iron end piece 49, the contour of which is corresponding to the end piece 13, and which consists of two transversal walls 50 and 51, of the longitudinal walls 52, and of the bottom wall 53. The timing gear housing accommodates all the gear means required to drive the valve timing, e.g. 54 and 55. The other end piece (not shown) accommodates the vibration damper with its corresponding bearings. The end pieces together with their contents are removable and are interchangeably mounted at and secured to the housing end elements 13 by means of bolts (indicated by bolt holes 56) in such a manner that they take over the reinforcement, locking with the end elements of the housing.

While I have shown and described only one embodiment in accordance with the present invention, it is understood that the same is not limited thereto but is susceptible of numerous changes and modifications as known to a person skilled in the art, and I therefore do not wish to be limited to the details but intend to cover all such changes and modifications.

I claim:

1. In a cylinder and crankshaft housing for a multi-cylinder liquid-cooled piston engine, particularly for a high-speed diesel engine of high specific output, assembled from welded together cast steel and sheet metal parts, which housing is subdivided transversely to the longitudinal axis of the engine into individual element-areas, including an upper cylinder area and a lower crankshaft bearing area, the individual element-areas consisting, within the cylinder area, of one half each of two adjacent continuous cylinder parts having supporting flanges and, within the area of the crankshaft bearing, of a support wall having an opening therein, all bearing support wall openings forming a crankshaft tunnel in which the crankshaft is supported on its disc-like crankwebs, and wherein the upper cylinder and lower crankshaft areas are either cast unitarily or fabricated from several pieces interconnected by means of a welding seam transmitting the dynamic stresses between the cylinder head and the crankshaft bearing, the improvement comprising:

two adjacent continuous cylinder halves shaped as approximately semi-cylindrical supports to accommodate a cylindrical liquid cooling jacket adapted to receive a cylinder liner therein;

a plurality of bosses for cylinder-head mounting bolts integrally cast to the semi-cylindrical supports, the cylinder supporting flange and, underneath, within a predetermined distance from said supporting flange, a longitudinal wall disposed substantially parallel to said flange; and the crankshaft bearing support wall extending approximately to the cylinder supporting flange between adjacent cylinder supports and including, in the upper area thereof, a fillet provided between the cylinder supports.

2. The improvement according to claim 1, wherein said engine includes an individual fuel injection device for each cylinder, including an individual fuel injection pump and a fuel injection nozzle, and wherein the cylinder supporting flange includes a lateral outer flange, wherein the longitudinal wall of the cylinder support arranged parallelly and longitudinally to the cylinder-supporting flange terminates in a longitudinal outer wall part which is located in the same plane as the lateral outer edge of the crankshaft bearing support wall and said lateral outer flange of said cylinder supporting flange, carrying the individual fuel injection pump.

3. The improvement according to claim 2, wherein each cylinder includes a cooling liquid jacket and wherein the longitudinal wall is provided with at least one reinforcement for the accommodation of bores within each cylinder area, said bores leading to the cooling liquid jacket of the adjacent cylinder and being interconnected by a cooling liquid feed line mounted to the outer longitudinal side of the engine.

4. The improvement according to claim 3, further comprising case-like end pieces reinforcing each of the elements at opposite ends of the housing, said end pieces having contours, including transverse and longitudinal walls, substantially conforming to those of the respective adjacent end elements, and a second transverse wall facing at least one of said end elements, said second transverse wall including timing gears, accessory drives, gear means, and the like, the thus completely enclosed case, together with its contents, being interchangeably connected to the corresponding housing end element by means of bolts, thus affording the necessary reinforcement.

5. The improvement according to claim 4, wherein said case-like end pieces are formed from cast steel.

6. The improvement according to claim 1 for a four-cycle internal combustion engine having camshafts arranged in the lower cylinder area, with the cams thereof acting, by way of push rods and rocker arms, on the valves and actuating the individual fuel injection pump for each cylinder, wherein the crankshaft bearing support wall, extending vertically up to the cylinder supports, is bifurcated into two walls, thus providing bearing supports for accommodating an actuating cam for the fuel injection pump, individually for each cylinder, arranged between these walls in the transverse plane between the cylinders.

7. In a cylinder and crankshaft housing for a multi-cylinder liquid-cooled piston engine, particularly for a high-speed diesel engine of high specific output, assembled from welded together cast steel and sheet metal parts, which housing is subdivided transversely to the longitudinal axis of the engine into individual element-areas, including an upper cylinder area and a lower crankshaft bearing area, the individual element-areas consisting, within the cylinder area, of one half each of two adjacent continuous cylinder parts having supporting flanges and, within the area of the crankshaft bearing, of a support wall having an opening therein, all bearing support wall openings forming a crankshaft tunnel in which the crankshaft is supported on its disc-like crankwebs, and wherein the upper cylinder and lower crankshaft areas are either cast unitarily or fabricated from several pieces interconnected by means of a welding seam transmitting the dynamic stresses between the cylinder head and the crankshaft bearing, the improvement comprising:

two adjacent continuous cylinder halves shaped as approximately semi-cylindrical supports to accommodate a cylindrical liquid cooling jacket adapted to receive a cylinder liner therein;

a plurality of bosses for cylinder-head mounting bolts integrally cast to the semi-cylindrical supports, the cylinder supporting flange and, underneath, within a predetermined distance from said supporting flange, a longitudinal wall disposed substantially parallel to said flange; and the crankshaft bearing support wall extending approximately to the cylinder supporting flange between adjacent cylinder supports.

8. The improvement according to claim 4, further comprising case-like end pieces reinforcing each of the elements at opposite ends of the housing, said end pieces having contours, including transverse and longitudinal walls, substantially conforming to those of the respective adjacent end elements, and a second transverse wall facing at least one of said end elements, said second transverse wall including timing gears, accessory drives, gear means, and the like, the thus completely enclosed case, together with its contents, being interchangeably connected to the corresponding housing end element by means of bolts, thus affording the necessary reinforcement.